July 2, 1968 C. GOODACRE ETAL 3,390,797
MEANS FOR ATTACHING A LIFT TRUCK TO A LORRY
Filed March 8, 1966 4 Sheets-Sheet 1
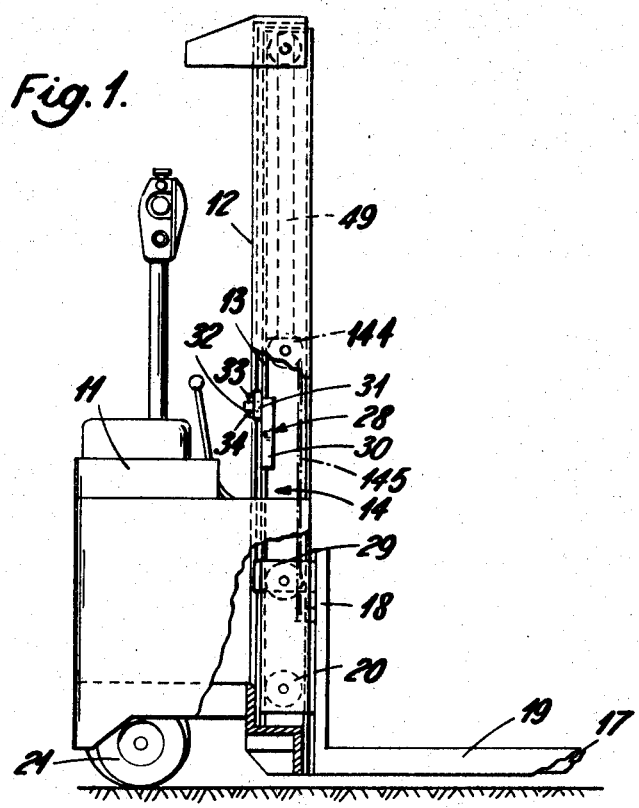
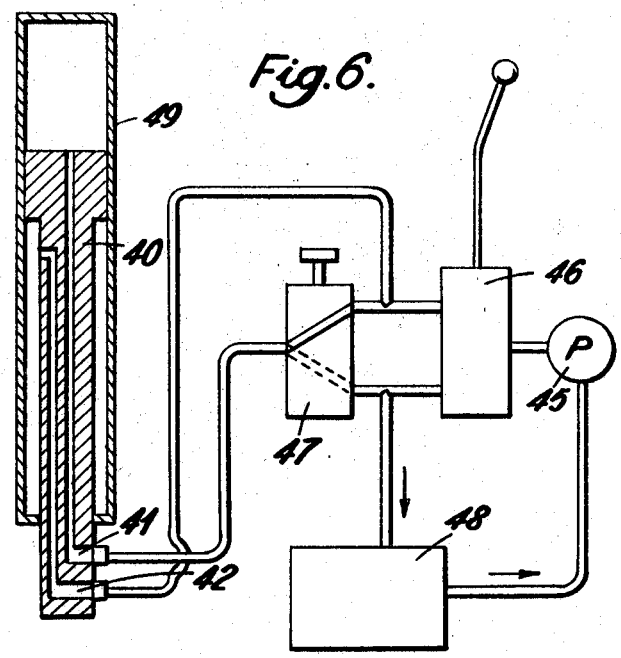

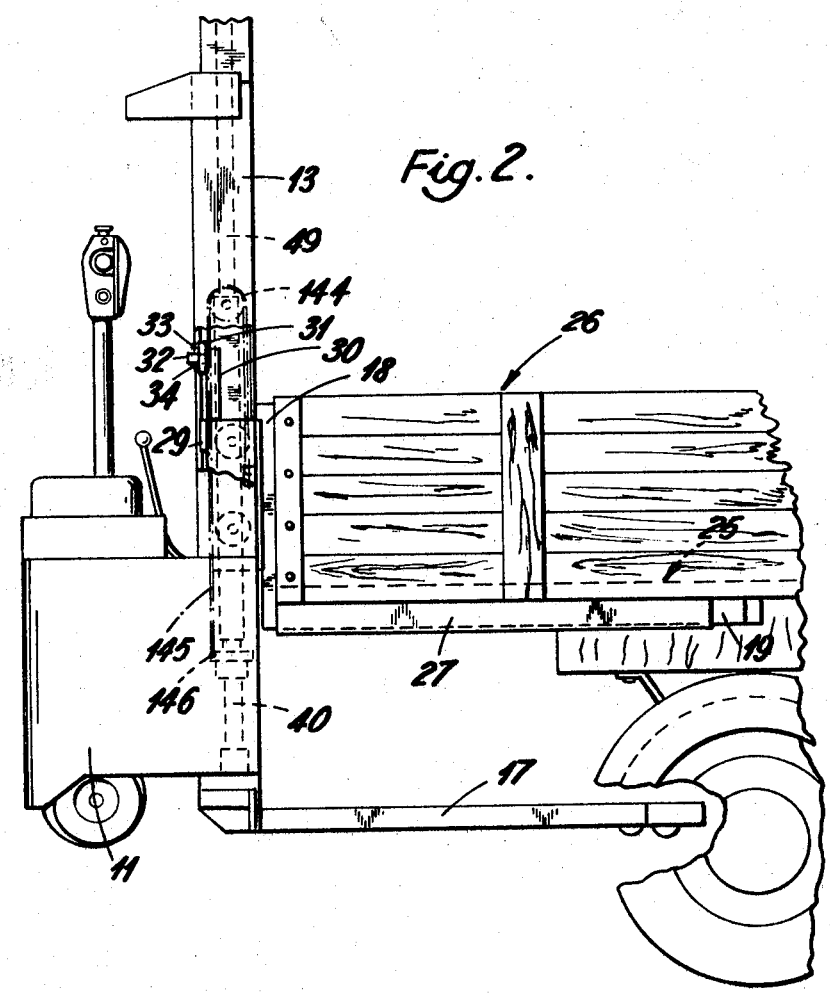

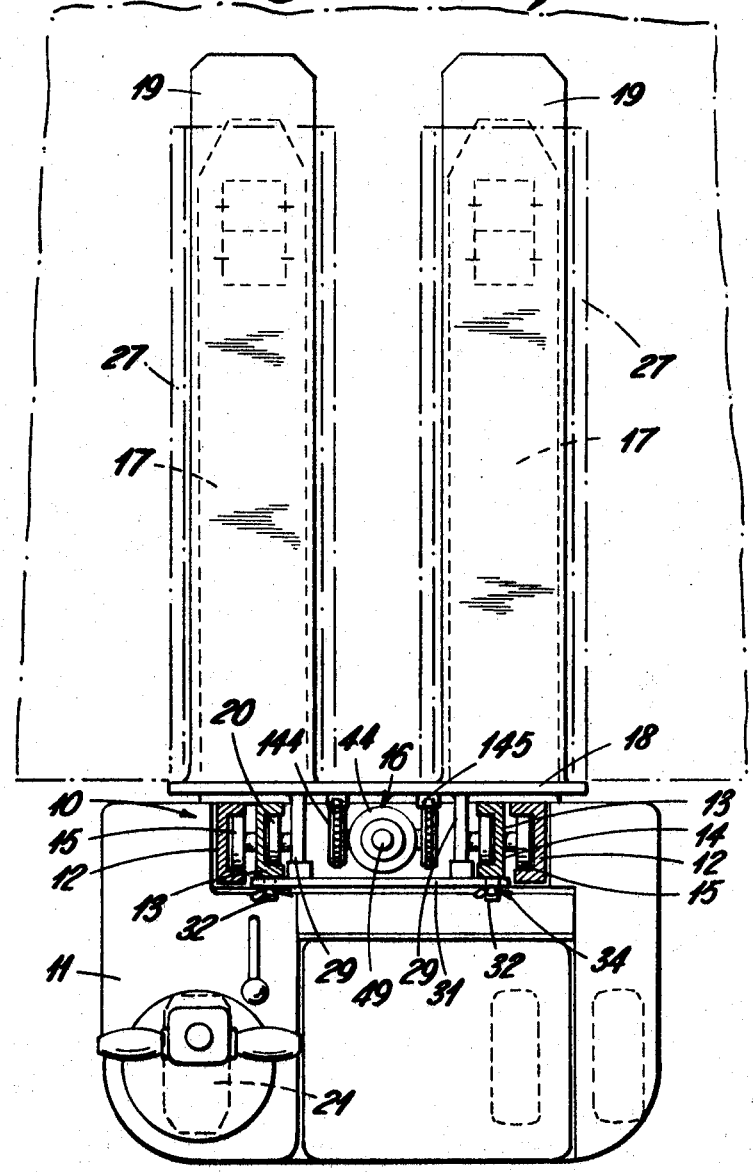

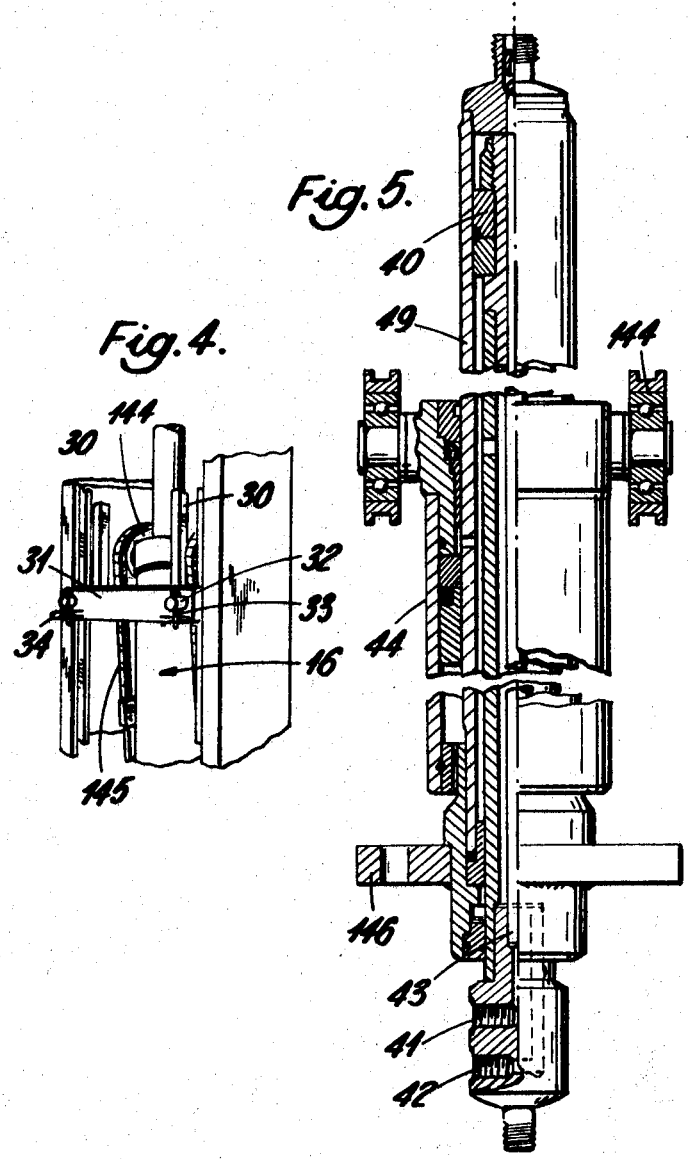

United States Patent Office 3,390,797
Patented July 2, 1968

3,390,797
MEANS FOR ATTACHING A LIFT TRUCK TO A LORRY
Cecil Goodacre and John David Dixon, Basingstoke, England, assignors to Lansing Bagnall Limited, Basingstoke, England, a British company
Filed Mar. 8, 1966, Ser. No. 532,674
Claims priority, application Great Britain, Mar. 9, 1965, 9,877/65
5 Claims. (Cl. 214—515)

ABSTRACT OF THE DISCLOSURE

There is provided in combination a lift truck and a lorry for transporting the truck in a position in which the truck is supported by the lorry above ground level, the truck having a lifting carriage mounted on the movable portion of an extensible mast and the lorry having means for locating the carriage in fixed relation with the lorry there also being provided on the movable mast, a stop member mounted above and engageable by the carriage to limit the downward movement of the movable mast so that the means (e.g. a double-acting hydraulic jack) provided for extending the mast can be operated to raise the fixed mast whilst the movable mast, the carriage and the lorry remain stationary.

---

The invention relates to means for attaching a lift truck to a lorry for the purpose of transporting the truck.

According to the invention there is provided in combination a lift truck and a lorry for transporting the truck, said combination comprising means for attaching the truck to the lorry in a position in which the truck is supported by the lorry above ground level, which truck has a body portion, a first mast which is fixed to the body portion and a second or movable mast which is capable of up and down movement on the first or fixed mast and which attachment means comprise means for attaching the movable mast in fixed relation with the lorry which means are capable of preventing relative up and down movement therebetween and operating means on the truck for effecting powered downward movement of the movable mast relative to the fixed mast whereby, when the movable mast is in a raised position and the movable mast is attached to the lorry by the said attachment means, said operating means can be operated to raise the fixed mast and truck body whilst the movable mast and the lorry remain stationary.

In one arrangement the attachment means comprise a lifting carriage on the movable mast, means being provided for locating the carriage of the truck in fixed relation with the lorry which means are capable of preventing relative up and down movement therebetween. In this case the truck may be a free lift truck in which the carriage is capable of up and down movement on the movable mast, the attachment means including means for at least limiting downward movement of the movable mast in relation to the carriage.

The carriage may also be a fork carriage, in which case a pocket or pockets are provided underneath the rear end of the deck of the lorry for reception of the forks of the carriage thereby locating the lifting carriage in fixed relation with the lorry.

The means for limiting the downward movement of the movable mast in relation to the carriage may be a stop member fixed to the movable mast above the carriage or a part or parts thereof and engageable by the carriage or the part or parts at a predetermined height of the carriage up the movable mast. This stop member may comprise a removable bar carrying stops for engagement by the carriage or the part or parts thereof. The position of the carriage on the movable mast when it or the part or parts thereof is in engagement with the stop member may be adjustable.

The operating means for effecting relative movement of the movable mast for effecting relative movement of the movable mast in relation to the fixed mast preferably comprises a double-acting hydraulic jack. It is also preferred that the jack is capable of successively power driving the carriage and then the movable mast in an upward direction in addition to being capable of power driving the movable mast in a downward direction.

The invention also includes a lift truck adapted for use as part of the combination.

By way of example, a specific embodiment in accordance with the invention will now be described with reference to the accompanying drawings in which:

FIGURE 1 is a side elevation of a free lift truck with its movable mast and its carriage in their lowest positions, which figure is part cut-away to show the stop member fixed to the movable mast;

FIGURE 2 is a side elevation, part cut-away, of the truck when supported by a lorry in its position above ground level, the forks of the carriage of the truck being inserted into a pair of pockets provided underneath the rear end of the deck of the lorry;

FIGURE 3 is a plan view, partly in section, of the truck as shown in FIGURE 2;

FIGURE 4 is a perspective view of the stop member fixed to the movable mast, the stop member being fitted differently to the manner shown in FIGURE 1;

FIGURE 5 is an elevation, half in section, of the double-acting hydraulic jack which is capable of raising the truck to its position shown in FIGURES 2 and 3; and FIGURE 6 is a schematic circuit drawing of the means for operating the jack shown in FIGURE 5.

With reference to FIGURES 1 to 3, a free lift truck is provided with an outer mast 10 fixed to the body portion 11 of the truck. This fixed mast 10 comprises a pair of uprights 12, and within these uprights there is a further pair of uprights 13 which constitute an inner or movable mast 14. The movable mast is provided with rollers 15 for engaging the fixed mast and is capable of being moved up and down the fixed mast by a hydraulic jack 16. The truck is also provided with forwardly projecting straddle legs 17 and a lifting carriage 18 having forwardly projecting forks 19 which in their lowest position lie on top of the legs 17. The lifting carriage is also provided with rollers 20 in sliding engagement with the uprights 13 of the movable mast 14 whereby the carriage is movable relative to the movable mast by means of the jack 16 and a chain system as will be described later.

The truck is also provided with ground wheels under the body portion of the truck and adjacent the end of each of the straddle legs. At least one of the wheels 21 under the body portion is power driven and is steerable.

The attachment means by which the truck may be supported by a lorry in its position above ground level will now be described.

Underneath the rear end of the deck 25 of a lorry 26 there are two pockets 27 for reception of the forks 19 of the carriage of the truck, which pockets prevent vertical movement of the carriage 18 relative to the lorry. The inner mast 14 of the truck is provided with a stop member 28 having stops 30 for engagement with rearwardly projecting arms 29 on the carriage 18 whereby when the carriage is raised so that the arms 29 engage the stops 30, further upward movement relative to the inner mast is precluded. Likewise, with the arms 29 in engagement with the stops 30 downward movement of the movable mast 14 relative to the carriage 18 is precluded. The stop member 28 comprises a horizontal bar 31 having two vertical members on its forward side comprising the stops 30, the lower end of each stop being engageable by one of the arms 29 on the carriage. It will be seen that in FIGURES 1 and 2, the stops 30 project downwardly from the bar and in FIGURE 4 the bar is reversed so that the stops project upwardly therefrom. Two alternative positions are thus provided in which the upward movement of the carriage is restricted to allow for alternative heights of lorry decks. The bar may also be fixed to the movable mast so that the stops 30 are on its rearward side, in which case the upward movement of the carriage will no longer be restricted thereby. The bar occupies this last position when the lift truck is used independently of the lorry as a normal free lift truck. The fixing of the bar 31 to the movable mast 14 comprises a pair of studs 32 (see especially FIGURE 4) projecting rearwardly from the uprights 13 of the mast, each stud having a hole for reception of a locking pin 33. One arm of a wire clip 34 is also inserted through a transverse hole in the end of each locking pin to hold the pin in place.

As described above, the mast 15 is movable on the fixed mast 10 by operation of the jack 16. With reference to FIGURES 5 and 6, the jack is a double-acting hydraulic jack modified so that the piston 40 may be power driven in both directions, i.e. during raising and lowering of the movable mast 14 with respect to the fixed mast 10. Hence if the jack is operated in a direction which will tend to retract the movable mast from a raised position and the movable mast is held against such movement then the fixed mast and hence the body portion of the truck will rise. The essential modifications required to produce this effect will now be described. The jack 16 is first provided with two inlets, one inlet 41 capable of feeding fluid through a central tube 43 to the topside of the piston 40 which fluid will tend to cause upward movement of a cylinder 49 which is attached to the top of the movable mast and the other inlet 42 capable of feeding fluid to the underside of the piston 40, which fluid will tend to cause downward movement of the movable mast if the inlet 41 is open to exhaust. The inlet 42 is also capable of conveying fluid to move a sleeve 44 in an upward direction which sleeve carries pulleys 144, over which run a pair of chains 145 connected between the carriage 18 and a bracket 146 secured to the lower end of the cylinder 49 hence causing free lift of the carriage. The difference in areas of the sleeve 44 and piston 40 is such that the carriage will normally be raised as high as possible before the movable mast is raised.

The hydraulic circuit for operation of the jack 16 (see FIGURE 6) employs a pump 45, a control valve 46 and a change-over valve 47. The control valve 46 determines the rate of flow of fluid from a tank 48 to both inlets 41, 42 and the position of the change-over valve determines whether fluid is to flow to inlet 41 or to be exhausted therefrom. In operation, if fluid is fed to both inlets 41, 42, i.e. with the change-over valve positioned as shown in full lines in FIGURE 6, the piston 40 will tend to move downwardly due to the area of the topside of the piston being greater than the area of the underside. However, in this construction, the lower end of the piston is rigidly secured to the fixed mast 10 and hence the cylinder 49 of the jack will rise thereby effecting an upward movement of the movable mast with respect to the fixed mast. On the other hand, if the position of the change-over valve is altered to its position shown in dotted lines in FIGURE 6, fluid will pass to exhaust from inlet 41 and both the cylinder 49 and the movable mast 14 will move or at least will tend to move downwardly with respect to the fixed mast 10. In this condition, as stated above, if the movable mast is held against such downward movement the fixed mast will rise.

Thus, for the truck to be supported by the deck 25 of the lorry 26 in a position in which the whole of the truck is above ground level, the carriage is first raised by the sleeve 44 of the jack 16 and the chains 145 until the arms engage the stops 30 of the stop member 28 fixed to the movable mast 14. The movable mast is then raised by the cylinder 49 of the jack 16 until the forks of the carriage 18 are level with the pockets 27 underneath the deck 25 of the lorry 26. The truck is then driven forward to insert the forks 19 within the pockets 27. The carriage 18 is thereby held against up and down movement relative to the lorry. The movable mast is also held against downward movement relative to the carriage. The change-over valve 47 of the jack 16 is then switched so that fluid will be passed to exhaust through inlet 41. Operation of the jack 16 will then pass fluid to the underside of the piston 40 to effect upward movement of the fixed mast 10 and the remainder of the truck into its raised position above ground level so that the truck can be transported by the lorry. The operations described above are reversed to return the truck to ground level at its destination, the truck then being used, e.g. for unloading goods from the lorry. The position of the stop member is, of course, first altered as described above so that the arms of the carriage will no longer engage the stops 30 of the stop member.

Means (not shown) would normally be provided, in use, for retaining the truck in the pockets at the rear of the lorry, such means, for example, being a chain slung between two spaced points on the lorry and extending across or around the truck.

It is to be appreciated that the invention is not restricted to the specific details of the embodiment described above. For example, it is not essential that the carriage should be capable of full 'free lift' movement on the movable mast. It is also possible for the movable mast to be fixed directly to the lorry by, for example, inter-engaging brackets on the movable mast and on the lorry.

We claim:

1. In combination a lift truck and a lorry for transporting the truck, said combination comprising means for attaching the truck to a lorry in a position in which the truck is supported by the lorry above ground level, which truck has a body portion, a first mast which is fixed to the body portion, a second or movable mast which is capable of up and down movement on the first or fixed mast, a lifting carriage on the movable mast which carriage is capable of up and down movement on the movable mast, operating means on the truck for effecting powered downward movement of the movable mast relative to the fixed mast, and means for limiting the downward movement of the movable mast in relation to the carriage, which means comprise a stop member fixed to the movable mast above at least a part of the carriage and engageable by the said part of the carriage at a predetermined height of the carriage up the movable mast, and which lorry is provided with means for locating the carriage of the truck in fixed relation with the lorry which means are thereby capable of preventing relative up and down movement therebetween, whereby when the movable mast is in a raised position, the carriage is located in fixed relation with the lorry and the stop member is in engagement with the said part of the carriage, downward movement of the movable mast is precluded and the said operating means can be operated to raise the fixed mast and the body portion of the truck whilst the movable mast, the carriage and the lorry remain stationary.

2. The combination claimed in claim 1 in which the operating means for effecting relative movement between the movable mast and the fixed mast is a double-acting hydraulic jack, which jack is operable to power-drive the movable mast relatively to the fixed mast in both an upward and a downward direction.

3. The combination as claimed in claim 1 in which the carriage is a fork carriage and in which a pair of pockets are provided underneath the rear end of the deck of the lorry for reception of the forks of the carriage thereby locating the carriage in fixed relation with the deck of the lorry.

4. The combination as claimed in claim 1 in which the stop member is a removable bar carrying stops for engagement by the said part of the carriage.

5. The combination as claimed in claim 1 in which the position of the carriage on the movable mast when the said part of the carriage is in engagement with the stop member is adjustable.

References Cited

UNITED STATES PATENTS 3,302,810   2/1967   Heidrick _____ 214—730

FOREIGN PATENTS 529,605   5/1940   Great Britain.

ALBERT J. MAKAY, *Primary Examiner.*